US006965942B1

(12) United States Patent
Young et al.

(10) Patent No.: US 6,965,942 B1
(45) Date of Patent: Nov. 15, 2005

(54) METHOD AND SYSTEM FOR IMPROVING THROUGHPUT OVER WIRELESS LOCAL AREA NETWORKS WITH A DYNAMIC CONTENTION WINDOW

(75) Inventors: Albert Young, Cupertino, CA (US); BoFu Chen, Fremont, CA (US); Bob O'Hara, Santa Clara, CA (US); Seema Nayek, San Jose, CA (US); Tim Schardt, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 645 days.

(21) Appl. No.: 09/759,389

(22) Filed: Jan. 12, 2001

(51) Int. Cl.[7] .......................... G06F 15/16; H04L 12/43
(52) U.S. Cl. ...................... 709/232; 709/224; 709/230; 370/447; 370/458; 370/461
(58) Field of Search ................. 709/105, 224, 709/228, 230, 232–235; 370/280, 347, 445, 370/447, 458, 461

(56) References Cited

U.S. PATENT DOCUMENTS

| 4,630,264 | A | * | 12/1986 | Wah et al. ................... 370/461 |
| 5,420,572 | A | * | 5/1995 | Dolin et al. ............. 340/825.5 |
| 5,819,028 | A | * | 10/1998 | Manghirmalani et al. ... 709/224 |
| 5,864,558 | A | * | 1/1999 | Johnson ....................... 370/445 |
| 6,078,568 | A | * | 6/2000 | Wright et al. ................ 370/445 |
| 6,285,662 | B1 | * | 9/2001 | Watanabe et al. ........... 370/280 |
| 6,587,453 | B1 | * | 7/2003 | Romans et al. ............. 370/347 |
| 6,697,013 | B2 | * | 2/2004 | McFarland et al. ......... 370/332 |
| 6,754,176 | B1 | * | 6/2004 | Gubbi et al. ................ 370/230 |
| 6,845,123 | B1 | * | 1/2005 | Nyberg et al. ............... 375/133 |
| 2002/0110085 | A1 | * | 8/2002 | Ho et al. ..................... 370/230 |

FOREIGN PATENT DOCUMENTS

WO    WO 01/33739 A1 * 11/2000 .......... H04B 7/212

OTHER PUBLICATIONS

M. Natkaniec, Analysis of the backoff mechanism used in IEEE 802.11 networks, 2000, Fifth IEEE Symposium on Computers and Communications, Vol., Iss., 2000 pp. 444-449.*

I. Aad, Introducing Service Differentiation into IEEE 802. 11, Jul. 2000, Fifth Symposium on Computers and Communications, pp. 438-443.*

P. Barker, Performance comparison of the IEEE 802.11 and Air infrared wireless MAC protocols, Dec. 1998, IEEE Communications Magazine, vol. 36, Issue 12, pp. 113-117.*

J. Conover, Anatomy of IEEE 802.11b Wireless, Aug. 2000, http://www.networkcomputing.com/1115/1115ws22.html.*

* cited by examiner

*Primary Examiner*—Ario Etienne
*Assistant Examiner*—Ramy Osman

(57) ABSTRACT

A method and system for increasing the overall network throughput over a wireless local area network (WLAN). Specifically, in one embodiment of the present invention, the dynamic selection of an initial value for a contention window in the Distributed Coordinated Function (DCF) mode is determined according to the load conditions over the WLAN in a method and system. Stations and access points within a WLAN monitor conditions within the network to establish an initial value for the contention window, also called a minimum contention window value, which is lower than that set by the IEEE 802.11 communication standard. Some factors to consider in determining the load conditions include but are not limited to the following: number of transmissions; number of receptions; and number of collisions.

24 Claims, 5 Drawing Sheets

TABLE 500

| Percentage Ratio of Collision Counts | Minimum Value for Initial Contention Window |
|---|---|
| 0-25% | 3 |
| >25-50% | 7 |
| >50-75% | 15 |
| >75% | 31 |

FIG. 5

METHOD AND SYSTEM FOR IMPROVING THROUGHPUT OVER WIRELESS LOCAL AREA NETWORKS WITH A DYNAMIC CONTENTION WINDOW

BACKGROUND OF THE INVENTION

1. Field of the Invention

The present invention relates to the field of increasing throughput in wireless local area network communications.

2. Related Art

A wireless local area network (WLAN) is a transmission system that provides for network access between electronic devices that are wireless end stations using radio waves instead of direct cable connections. In the IEEE 802.11 standard, the WLAN consists of a number of basic service sets (BSS) that are joined by a distribution system into an extended service set (ESS). Within the ESS, a mobile unit or end station may roam at will while continuously maintaining a connection to the network.

Each BSS is controlled by an access point (AP). Each AP communicates with the end stations over the wireless medium in its BSS. The AP communicates with other APs and other nodes on the network via the distribution system. A function of the AP, among many others, is to relay network traffic from the end stations in its BSS through the distribution system to the destination. The destination of this traffic may be another end station in the same, or different, BSS, or the destination may be a node on a wired LAN (such as ethernet) connected to the distribution system. The AP provides this relaying function for multiple mobile units simultaneously. The relaying of traffic for multiple end stations results in an asymmetric distribution of the load entering a BSS.

The IEEE 802.11 standard uses a default or basic access mechanism implemented in the 802.11 Media Access Control (MAC) layer. The 802.11 MAC layer protocol is called the Distributed Coordination Function (hereinafter referred to as "DCF"), that provides fair access to all users of the WLAN.

For example, in a BSS where the AP is relaying traffic for nine end stations, and where the traffic from each end station generates an equal amount of returned traffic to that end station, the IEEE 802.11 standard provides for the default DCF access mechanism to provide fair access to all users, including the AP, of the WLAN.

In the foregoing example, the available bandwidth of the BSS would be shared equally among the nine end stations and the AP, with each approximately receiving a minimum of ten percent of the available bandwidth. In a sense, there is symmetric access to the network, where none of the end stations nor the AP have network access priority over the other users.

Basically when using the DCF access mechanism, a station that senses that the transmission medium is available is allowed to transmit over the WLAN. If the medium is not free, then the station waits for a certain time before trying to transmit again. This waiting period is a called a backoff period. The IEEE 802.11 standard and its variations uses Carrier Sense Multiple Access with Collision Avoidance (CSMA/CA) mechanism with a random backoff for wireless connectivity between fixed, portable, and moving stations within a local area.

Furthermore, the backoff period is a delay of a random length. The backoff period is determined whenever a station detects that the medium is busy at the time the station attempts to begin a transmission, or if it determines that a collision event has occurred because its transmission is not acknowledged according to the protocol operating rules. The backoff period is also used after each successful transmission. This delay is randomly selected from a "contention window" that begins with a fixed value. For each subsequent collision event or busy condition of the medium that is detected for a given or subsequent attempted transmission, the contention window size is approximately doubled and a new random delay is selected from the contention window. In the 802.11b standard, the initial value of the contention window is 31 slots. The sequence of contention window values is as follows: 31, 63, 127, 255, 511, to a maximum of 1023 slots.

As a compromise between higher performance when the network is lightly loaded and minimizing the number of consecutive collisions as the load increases, the initial value of the contention window is relatively large. The result of having a large initial value for the contention window is that transmissions are delayed significantly after determining the medium is busy, suffering a collision event, or on a transmission attempt that immediately follows a successful transmission by the same station. While this is the desired behavior when the network is operating with a significant offered load, in lightly loaded conditions the delay is excessive and results in reduced overall throughput. Thus, a need exists for increasing throughput in a wireless local area network especially during lightly loaded conditions.

SUMMARY OF THE INVENTION

The present invention provides an apparatus and method which increases the overall network throughput over a wireless local area network (WLAN) during periods where the load conditions are light.

Specifically, in one embodiment of the present invention, the dynamic selection of minimum values for a contention window in the Distributed Coordinated Function (DCF) mode is determined according to the conditions over a wireless local area network (WLAN) in a method and system. Stations and access points within a WLAN monitor conditions within the network to establish an initial value for the contention window, which is also called a minimum contention window value, that is lower than that set by the IEEE 802.11 communication standard and its variations. Some factors to consider in monitoring overall network conditions include but are not limited to the following: number of transmissions; number of receptions; and number of collisions.

In another embodiment of the present invention, a ratio of collision counts for a specific period of time over a WLAN is calculated in order to set the minimum initial value for the contention window. Factors that are calculated to determine the ratio of collision counts are as follows: the number of transmissions over the WLAN; the number of virtual carrier sense (VCS) collisions; and the number of physical carrier sense (PCS) collisions. The total number of collisions is the number of virtual carrier sense collisions added to the number of physical carrier sense collisions. The collision count ratio is calculated as follows:

$$\frac{\text{collision}}{\text{ratio}} = \frac{\text{number of collisions}}{\text{number of transmissions} + \text{number of collisions}}$$

In one embodiment of the present invention, the minimum value of the contention window is determined in relation to the collision count ratio as a percentage. For higher ratios, the minimum value of the contention window approaches the IEEE 802.11b standard value of thirty-one slots. For lower ratios, the minimum value of the contention window can approach values as low as zero slots.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 5 is a table of values used in calculating a minimum value for a contention window, in accordance with one embodiment of the present invention.

Figure 1:
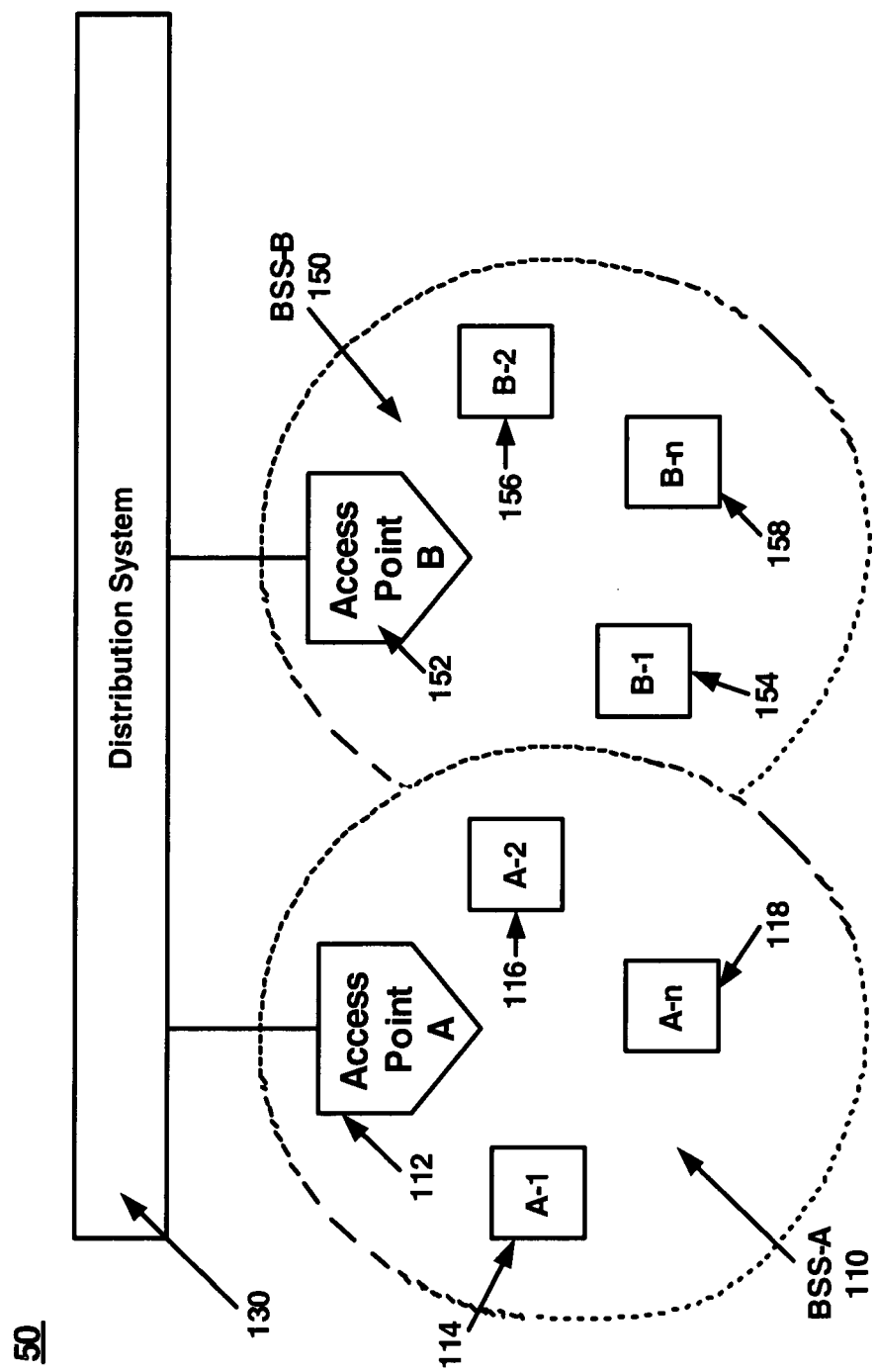
FIG. 1 illustrates a block diagram of a communication network environment that follows the IEEE 802.11 protocol in accordance with one embodiment of the present invention.

The drawings referred to in this description should be understood as not being drawn to scale except if specifically noted.

DETAILED DESCRIPTION OF THE INVENTION

Reference will now be made in detail to the preferred embodiments of the present invention, a method and system for increasing throughput in a wireless local area network (WLAN), examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

IEEE 802.11 Communication Standard

Some embodiments of the present invention are discussed primarily in a context in which devices and systems are coupled using wireless links, and specifically with regard to devices and systems compliant with the IEEE 802.11 communication standard. However, it is appreciated that the present invention may be utilized with devices and systems coupled using technologies, standards, and/or communication protocols other than the IEEE 802.11 communication standard.

The 802.11 standard defines two modes of operation: infrastructure mode and ad hoc mode. In the infrastructure mode as shown in FIG. 1, the communication network 50 is comprised of wired and wireless networks. The wireless network consists of at least one access point (AP) connected to the wired network infrastructure and a set of wireless end stations. This configuration describes a cell unit called a basic service set (BSS). Furthermore, an Extended Service Set (ESS) is a set of two or more BSSs forming a single subnetwork. Most corporate WLANs require access to the wired LAN for services (file servers, printers, Internet links) and would operate in the infrastructure mode.

The ad hoc mode (also called peer-to-peer mode or an Independent Basic service Set, or IBSS) is simply a set of 802.11 wireless stations that communicate directly with one another without using an access point or any connection to a wired network. This mode is useful for quickly and easily setting up a wireless network anywhere that a wireless infrastructure does not exist or is not required for services, such as a hotel room, convention center, or airport, or where access to the wired network is barred (such as for consultants at a client site).

FIG. 1 shows two basic service sets in a communication network 50 operating in infrastructure mode, BSS-A 110 and BSS-B 150. In BSS-A 110, an access point AP-A 112 is wired to the distribution system 130. Various end stations, A-1 114, A-2 116, on up to A-n 118 are connected to AP-A through a wireless connection. Similarly, in BSS-B 150, an access point AP-B 152 is wired to the distribution system 130. Various end stations, B-1 154, B-2 156, and on up to B-n 158 are connected to AP-B 152 through a wireless connection. The network 50 could support and operate with more than two basic service sets.

The 802.11 standard defines two pieces of equipment, a wireless end station, which is usually a personal computer (PC) equipped with a wireless network interface card (NIC), but could be any electronic device operable under the 802.11 standard, and an access point (AP), which acts as a bridge between the wireless and wired networks.

Wireless end stations can be 802.11 PC Card, Peripheral Component Interconnect (PCI), or Industry Standard Architecture (ISA) NICs, or embedded solutions in non-PC clients (such as an 802.11-based telephone handset).

An access point usually consists of a radio, a wired network interface (e.g. 802.3), and bridging software conforming to the 802.11 bridging standard. The AP acts as the base station for the wireless network, aggregating access for multiple wireless stations onto the wired network, such as the distribution system 130 in FIG. 1.

Each BSS is controlled by an access point (AP). Each AP communicates with the end stations over the wireless medium in its BSS. The AP communicates with other APs and other nodes on the network 50 via the distribution system 130. A function of the AP, among many others, is to relay network traffic from the end stations in its BSS through the distribution system to the destination. The destination of this traffic may be another wireless end station in the same, or different, BSS, or the destination may be a node on a wired LAN (such as ethernet) connected to the distribution system. The AP provides this relaying function for multiple end stations simultaneously. The relaying of traffic for multiple end stations results in an asymmetric distribution of the load entering a BSS.

The IEEE 802.11 standard uses a default or basic access mechanism implemented in the 802.11 Media Access Control (MAC) layer. The 802.11 MAC layer protocol is called the Distributed Coordination Function (hereinafter referred to as "DCF"), that provides fair access to all users of the WLAN.

Additionally, since stations on a network using radio transceivers cannot transmit and receive simultaneously on a single channel, the IEEE 802.11 wireless local area networking standard use a Carrier Sense Multiple Access/Collision Avoidance (CSMA/CA) method when operating under the DCF access mechanism. Also, the IEEE 802.11 standard uses CSMA/CA collision avoidance mechanism together with a positive acknowledgment of packets received to determine access to the network.

Figure 2:
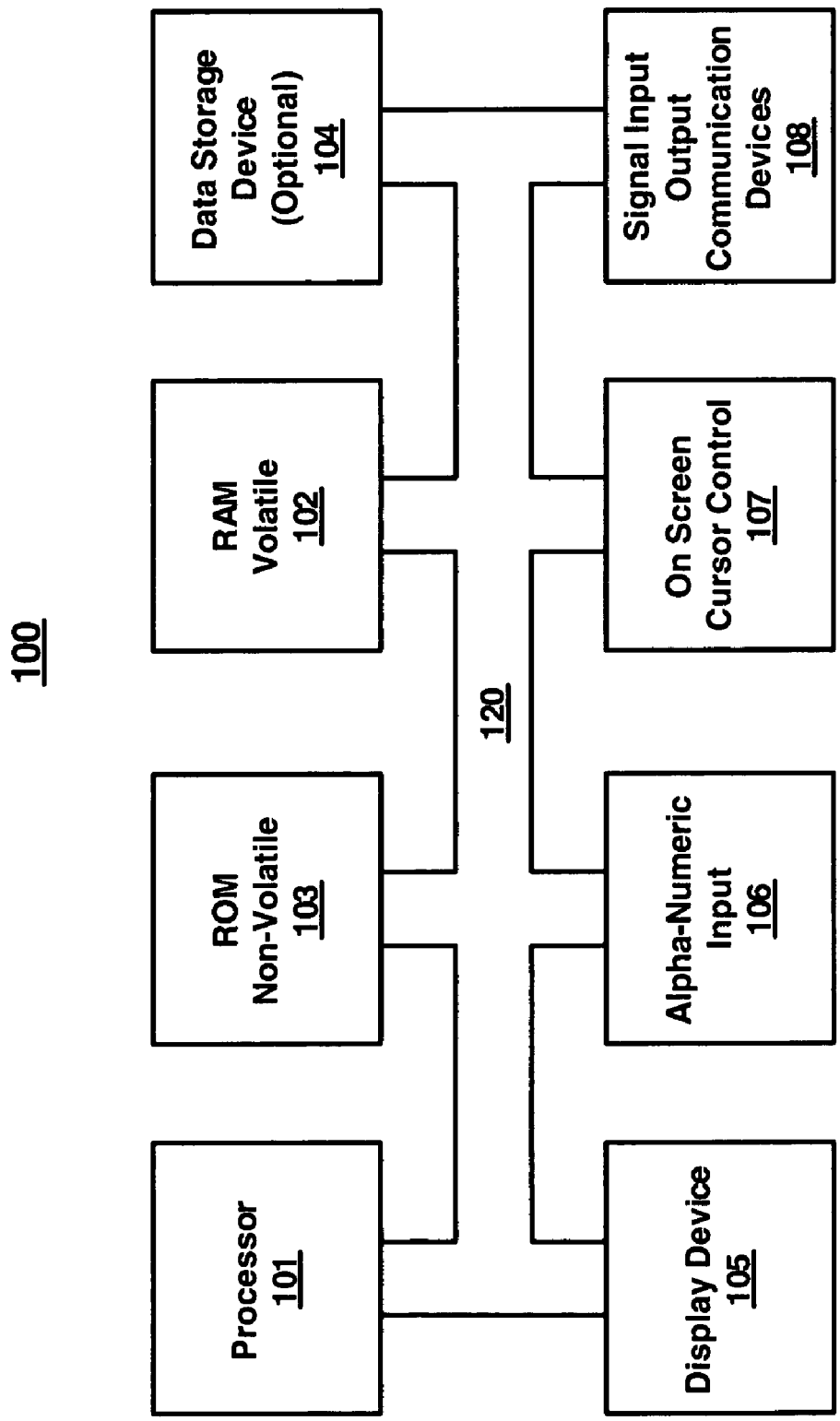
FIG. 2 is a schematic diagram of an exemplary computer system used to perform steps in determining a minimum value for a contention window, in accordance with one embodiment of the present invention.

Referring to FIG. 2, portions of the methods and systems for selection of the minimum initial value for a contention window are comprised of computer-readable and computer executable instructions which reside, for example, in computer-usable media of a computer system. FIG. 2 illustrates an exemplary computer system 100 used to perform the dynamic selection of the minimum value for a contention window in accordance with embodiments of the present invention. It is appreciated that system 100 of FIG. 2 is exemplary only and that the present invention can operate within a number of different computer systems including general purpose networked computer systems, embedded computer systems, and stand-alone computer systems. Additionally, computer system 100 of FIG. 2 is well adapted to having computer readable media such as, for example, a floppy disk, a compact disc, and the like coupled thereto. Such computer readable media is not shown coupled to computer system 100 in FIG. 2 for purposes of clarity.

System 100 can include any computer-controlled software application for determining the minimum value of a contention window. In general, computer system 100 comprises an address/data bus or other communication means 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, a non-volatile memory 103 (e.g., read only memory (ROM), programmable ROM, flash memory, EPROM, EEPROM, etc.) coupled with the bus 120 for storing static information and instructions for the processor 101, a data storage device 104 (e.g., memory card, hard drive, optical disk, etc.) coupled with the bus 120 for storing information and instructions. System 100 of the present invention also includes an optional display device 105 coupled to the bus 100 for displaying information to the computer user. System 100 also optionally includes an alphanumeric input device 106 including alphanumeric and function keys coupled to the bus 120 for communicating information and command selections to the central processor 101. System 100 also optionally includes a cursor control device 107 coupled to the bus for communicating user input information and command selections to the central processor 101, and an Input/Output (I/O) device 108 coupled to the bus 120 for providing a communication link between computer system 100 and a network environment.

The display device 105 of FIG. 2 utilized with the computer system 100 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices or by other means such as, for example, voice commands. A more detailed discussion of the dynamic selection of minimum values for a contention window method and system embodiments of the present invention is found below.

Dynamic Selection of Initial Values for a Contention Window

Local area networking standards, such as the IEEE 802.11 standard, use an access mechanism called Distributed Carrier Sense Multiple Access with Collision Avoidance (CSMA/CA). The CSMA/CA protocol involves selecting a delay of a random length whenever a station detects that the medium is busy. This random delay is selected from a "contention window" that begins with an initial value, or initial number of slots, where each slot is a period of 20 microseconds in the IEEE 802.11b standard. For each subsequent collision event or busy condition of the medium that is detected for a given transmission, the contention window size is approximately doubled and a new random delay is selected from the new contention window. A random delay is also selected after each successful transmission by a station to prevent contiguous transmissions by a single station. The IEEE 802.11 standard and its variations use the CSMA/CA protocol for transmission over the wireless local area network where each of the stations and the access point (AP) operate under a distributed coordination function (DCF) access mechanism.

For contextual purposes, the methods and systems for dynamically selecting a minimum value for a contention window can be used in a wireless local area network that follows the IEEE 802.11 communication standard and its variations. However, the present invention is well suited to being used with other types of communications protocols and standards.

Figure 3:
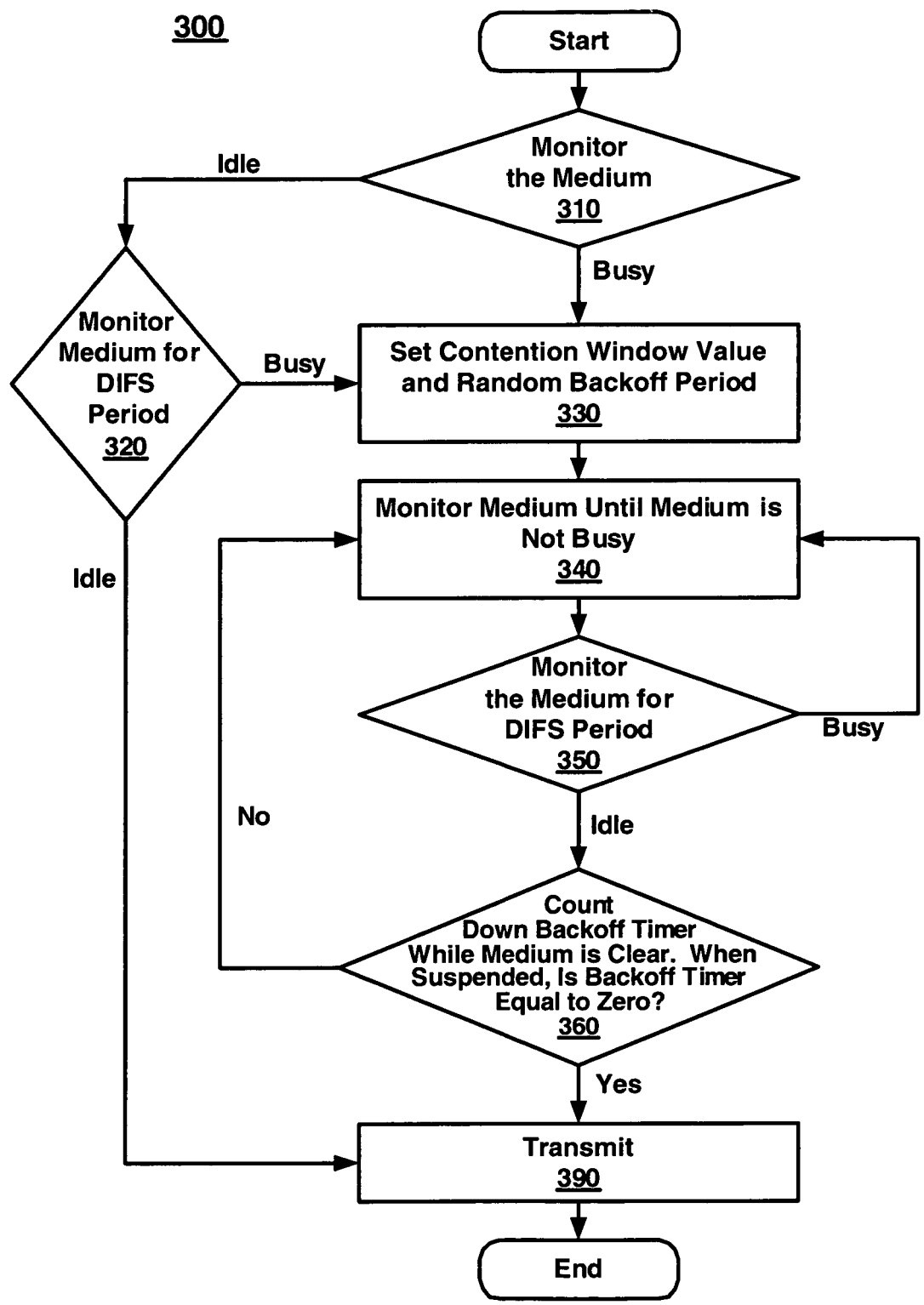
FIG. 3 is a flow chart of steps performed for the operation of the CSMA/CA contention based IEEE 802.11 distributed coordinated function (DCF) access mechanism.

FIG. 3 illustrates the DCF access mechanism in process 300 in one embodiment of the present invention. When using the DCF access mechanism, a station wanting to transmit a data frame senses the transmission medium or channel in step 310. Following the case where the medium is completely idle through process 300, if the medium is idle in step 310, then the station waits for an interval called distributed interframe space (DIFS) in step 320. If the medium again remains idle, then the process 300 skips to step 390 and transmits the data frame.

However, if in step 310 or 320 the medium is busy, then process 300 proceeds to step 330 where the contention window is set in the present embodiment. A backoff period is also randomly set from within this contention window in step 330. This backoff period sets the amount of time for a backoff counter to decrement to allow the station to transmit the data frame.

After the backoff period is set, the process 300 proceeds to step 340 where the station defers transmission and monitors the medium until the current transmission is completed. In step 350, the station monitors the transmission medium for another DIFS period. If the medium becomes busy, then process 300 goes back to step 340. However, if the medium remains idle, then the process proceeds to step 360.

In step 360, the station begins to count down or decrement the backoff period set in the backoff counter. Whenever the channel is clear, the countdown continues. If the station senses the channel is busy, then the backoff counter suspends the countdown until the channel is clear again whereupon it waits again for a DIFS period, and then starts to countdown again. When the backoff counter reaches zero, then the station is allowed to transmit the data frame in step 390.

Although specific steps are disclosed in process 300 of FIG. 3, such steps are exemplary. That is, the present invention is well suited to performing various other steps or variations of the steps recited in FIG. 3.

Additionally, it is understood that process 300 of FIG. 3 is exemplary of the IEEE 802.11 communication standard. Any other process by which a station delays its transmissions utilizing either local information only or a combination of local information and information received from other stations may be substituted for process 300 in the present invention.

The receiving station checks the cyclic redundancy check (CRC) of the received packet and sends an acknowledgment packet (ACK) back to the transmitting station. When the transmitting station receives the ACK from the receiving station, the transmission was successful. However, if the transmitting station does not receive the ACK, then it will continue to retransmit until the transmission is successful up to a given number of retransmissions upon which point the packets are discarded.

In process 300, the backoff algorithm provides a method for reducing the contention between different stations wanting to access a transmission medium. The backoff algorithm in process 300 is executed in the following three cases in one embodiment of the present invention, as follows: 1) when the station senses the medium is busy before the first transmission of a data frame; 2) after each retransmission; and 3) after each successful transmission.

Process 300 relies on Physical Carrier Sense, where the assumption is made that each station can hear all the other stations within a BSS. However, one station may not always be able to hear another station within its BSS. In order to reduce collisions because one station cannot hear another station, the IEEE 802.11 standard defines a Virtual Carrier Sense mechanism.

The Virtual Carrier Sense mechanism relies on the fact that the access point (AP) is able to hear all the stations within a BSS. In this mechanism, a station is able to reserve the transmission medium for a specified period of time. The station wanting to transmit a data frame first transmits a short request to send (RTS) control packet to the AP which includes the source, destination, and duration of the following transmission. Upon receipt of the RTS, the AP responds with a clear to send (CTS) frame which specifies the period of time for which the medium is reserved. All stations receiving either the RTS or CTS frames will set their network allocation vector (NAV) accordingly for the given duration and will use this information together with the physical carrier sense when sensing the medium to determine whether the medium is busy or idle.

In one embodiment of the present invention, the minimum value for the initial contention window is dynamically selected to be a value that is less than the IEEE 802.11 standard according to the load conditions over the network. For each subsequent collision event or busy condition, the contention window size is approximately doubled. The new contention window is calculated as the sum of two times the previous contention window plus one, as in the IEEE 802.11 communication standard. The backoff period is randomly selected in relation to each subsequent contention window.

The IEEE 802.11 standard and its variations set a minimum initial value for the initial contention window at 31 slots, particularly in the IEEE 802.11b standard. For each subsequent collision event or busy period, for example, the contention window increases exponentially until it reaches the maximum value of 1023. In one embodiment of the present invention, the minimum value for the initial contention window is dynamically selected to be a number between zero and 31 depending on the load conditions over the network. For light load conditions, the minimum value of the contention window can approach values as low as zero. For high load conditions, the minimum value of the contention window the IEEE 802.11 standard and its variations of thirty-one slots.

Since the minimum value can be significantly less than 31 slots, each subsequent contention window of the present embodiment increases at a slower exponential rate to the maximum of 1023 than the IEEE 802.11 standard. This in turn lowers the backoff period selected randomly from each subsequent contention window.

For example, in calculating the second contention window, instead of a new contention window that is approximately double (63 slots) the size of the previous initial 31 slot contention window, as in the IEEE 802.11 standard and its variations, the new contention window can be significantly smaller. Under the present embodiment, the second contention window can be as low as 1 if the initial contention window was zero. This improvement in contention window values and the related backoff period is exponentially realized with each subsequent collision event or busy condition.

In another embodiment of the present invention, the dynamic selection of the minimum value of the contention window is dependent on the load conditions over the network. Each station in the network maintains a number of local variables, such as those variables required by the IEEE 802.11 standard, that can be used to indicate the load on the network. These variables include but are not limited to counts of frames transmitted and received, collisions events, multiple collision events, and others. By examining these variables, a station can calculate a reasonable estimate of the total offered load. In situations where the offered load is small, the overall throughput of the network may be increased by reducing the minimum contention window value below that described in the standard. This will significantly reduce the delay suffered by a transmission after a collision event or when determining that the medium is busy. An algorithm can monitor the variables indicating the load on the network and modify the value of the minimum contention window appropriately to balance increasing throughput against increasing load.

Figure 4:
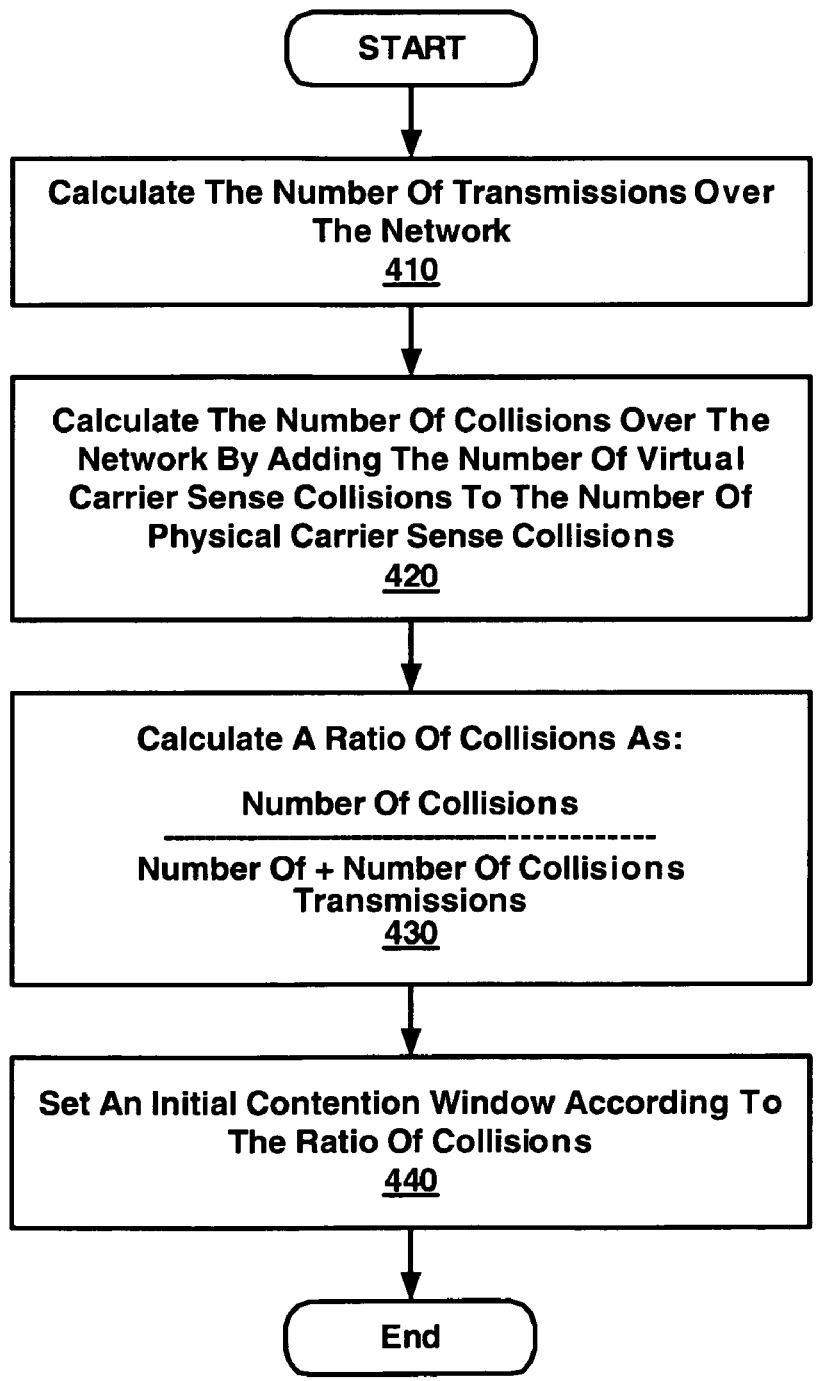
FIG. 4 is a flow chart of steps performed for dynamically determining a minimum value for a contention window, in accordance with one embodiment of the present invention.

FIG. 4 illustrates an exemplary data flow chart 400 of exemplary steps used in one embodiment of the present invention to calculate the initial value of a contention window. For example, the process as illustrated in flow chart 400 may be implemented in step 330 of FIG. 3. Although specific steps are disclosed in flow chart 400 of FIG. 4, such steps are exemplary. That is, the present invention is well suited to performing various other steps or variations of the steps recited in FIG. 4 in order to calculate or determine the load over the communication network. Further, other more appropriate variables may be implemented or examined to determine the load over the communication network depending on the conditions.

Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 102 and/or computer usable non-volatile memory 103 of FIG. 2. The computer-readable and computer-executable instructions are used to control or operate in conjunction with, for example, central processing unit 101 of FIG. 2.

In step 410 of flow chart 400, the number of transmissions over the network is calculated in one embodiment of the present invention. In step 420, the number of collisions over the network is calculated. To determine the number of collisions, the number of virtual carrier sense collisions (as associated with a Network Allocation Vector) is added to the number of physical carrier sense collisions for a given duration.

In step 430 the ratio of collisions is calculated. The numerator in step 430 is the number of collisions as calculated in step 420. The denominator is the sum of the number of transmissions as calculated in step 410 and the number of collisions as calculated in step 420. The ratio of collisions is illustrated as follows:

$$\frac{\text{collision}}{\text{ratio}} = \frac{\text{number of collisions}}{\text{number of transmissions} + \text{number of collisions}}$$

The flow chart 400 in FIG. 4 then determines an initial value for the contention window in step 440. The initial value for the contention window is determined according to the ratio of collisions as calculated in step 430 in relation to Table 500 in FIG. 5. Calculating the collision ratio as a percentage, the initial contention window value is determined. For example, for a collision ratio between 0 and 25 percent, the initial value of the contention window is three slots. The initial random backoff time is a uniform distribution over zero (0) and the contention window value.

The process in flow chart 400 may be repeated continuously, periodically, or asynchronously.

In comparison to the IEEE 802.11 standard and its variations, particularly the IEEE 802.11b standard, which permanently sets the minimum value to 31 slots, there is a significant reduction in the backoff time or period before retransmission. This reduction is exponentially realized with each subsequent collision event, busy condition, transmission, or retransmission. For periods when light load conditions exist, significant improvement of throughputs can be achieved.

In Table 500, for ratios greater than 25 percent to 50 percent, the minimum value for the contention window is seven (7) slots. For ratios greater than 50 percent to 75 percent, the minimum value for the contention window is twenty-two (22) slots. For ratios greater than 75 percent, the minimum value for the contention window is thirty-one (31) slots.

The numbers in Table 500 are for illustration only. Each of the minimum values may consist of different values for optimum performance. Further, the present invention is also well suited to various other embodiments which employ considering other various load networking functions comprised of additional factors, alternate factors, or combinations which include the additional or alternate factors.

The preferred embodiment of the present invention, a method and system for dynamically selecting an initial value for a contention window in the DCF mode, is thus described. While the present invention has been described in particular embodiments, it should be appreciated that the present invention should not be construed as limited by such embodiments, but rather construed according to the below claims.

What is claimed is:

1. In a communication network including a plurality of stations, a method of accessing said network for a first station, from said plurality of stations, comprising the steps of:

periodically monitoring a load of traffic over said communication network;

measuring said load of traffic over said communication network, wherein said measuring said load of traffic includes calculating a collision rate over a specific period of time, wherein said calculating a collision rate further comprises:

determining a number of transmissions over said network;

determining a number of virtual carrier sense collisions over said network;

determining a number of physical carrier sense collisions over said communication network;

determining a total number of collisions by adding said number of virtual carrier sense collisions to said number of physical carrier sense collisions together; and calculating said collision rate by dividing said total number of collisions by the sum of said number of transmissions and said total number of collisions; and dynamically setting a minimum contention window (CW) value of a contention window according to said load of traffic over said communication network.

2. The method as described in claim 1, wherein said step of monitoring is implemented continually.

3. The method as described in claim 1, wherein said step of monitoring is implemented asynchronously.

4. The method as described in claim 1, wherein said plurality of stations are substantially compliant with a version of the IEEE 802.11 protocol.

5. The method as described in claim 1, wherein said minimum CW value is selected from a range of values according to said collision rate.

6. The method as described in claim 5, wherein said minimum CW value is selected from said range of values as follows:
   for said collision rate between zero up to and including 25 percent, said minimum CW value is three slots;
   for said collision rate between greater than 25 percent up to and including 50 percent, said minimum CW value is seven slots;
   for said collision rate between greater than 50 percent up to and including 75 percent, said minimum CW value is fifteen slots; and
   for said collision rate greater than 75 percent, said minimum CW value is 31 slots.

7. The method as described in claim 6, wherein each slot is equal to 20 microseconds.

8. The method as described in claim 1, wherein said contention window includes a CW value, wherein said minimum CW value of said contention window is used to calculate subsequent CW values of said contention window, whereby said subsequent CW values include a first, second, and on up to $n^{th}$ CW values, whereby said first CW value is calculated as two times said minimum CW value plus one, and subsequent CW values for said content on window are calculated such that $CW_n = 2(CW_{n-1}) + 1$.

9. The method as described in claim 8, comprising the further step of setting a backoff period from said contention window by randomly selecting a value between zero and said CW value of said contention window.

10. In a communication network including a plurality of stations, a method of accessing said communication network for a first station, from said plurality of stations, comprising the steps of:
   monitoring a load of traffic over said communication network;
   calculating a number of transmissions over said communication network over a specific period of time as a measure of said load of traffic;
   calculating a total number of collisions over said communication network over said specific period of time as a measure of said load of traffic, wherein said total number of collisions includes a number of virtual carrier sense collisions and a number of physical carrier sense collisions over said communication network;
   dynamically setting a minimum contention window (CW) value of a contention window as a function of said number of transmissions and said total number of collisions; and
   calculating a collision rate by dividing said total number of collisions by the sum of said number of transmissions and said total number of collisions.

11. The method as described in claim 10, wherein said plurality of stations is substantially compliant with a version of the IEEE 802.11 protocol.

12. The method as described in claim 10, wherein said minimum CW value of said contention window is dynamically selected from a range of values according to said collision rate as follows:
   for said collision rate between zero up to and including 25 percent, said minimum CW value is three slots;
   for said collision rate between greater than 25 percent up to and including 50 percent, said minimum CW value is seven slots;
   for said collision rate between greater than 50 percent up to and including 75 percent, said minimum CW value is fifteen slots; and
   for said collision rate greater than 75 percent, said minimum CW value is thirty-one slots.

13. The method as described in claim 12, wherein each slot is equal to 20 microseconds.

14. The method as described in claim 10, wherein said contention window includes a CW value, wherein said minimum CW value of said contention window is used to calculate subsequent CW values of said contention window, whereby said subsequent CW values include a first, second, and on up to $n^{th}$ CW values, whereby said first CW value is calculated as two times said minimum CW value plus one, and subsequent CW values for said contention window are calculated such that $CW_n = 2(CW_{n-1}) + 1$.

15. The method as described in claim 14, comprising the further step of setting a backoff period from said contention window by randomly selecting a value between zero and said CW value of said contention window.

16. A computer system comprising a processor, a memory unit, and a display screen, wherein said memory contains instructions that when executed implement a method of accessing said network for a first station, from said plurality of stations, comprising the steps of:
   periodically monitoring a load of traffic over said communication network;
   measuring said load of traffic over said communication network, wherein said measuring said load of traffic includes calculating a collision rate over a specific period of time, wherein said calculating a collision rate further comprises:
   determining a number of transmissions over said network;
   determining a number of virtual carrier sense collisions over said network;
   determining a number of physical carrier sense collisions over said communication network;
   determining a total number of collisions by adding said number of virtual carrier sense collisions to said number of physical carrier sense collisions together; and
   calculating said collision rate by dividing said total number of collisions by the sum of said number of transmissions and said total number of collisions; and
   dynamically setting a minimum contention window (CW) value of a contention window according to said load of traffic over said communication network.

17. A computer system as described in claim 16, wherein said step of monitoring is implemented continually.

18. A computer system as described in claim 16, wherein said step of monitoring is implemented asynchronously.

19. A computer system as described in claim 16, wherein said plurality of stations are substantially compliant with a version of the IEEE 802.11 protocol.

20. A computer system as described in claim 16, wherein said minimum CW value is selected from a range of values according to said collision rate.

21. A computer system as described in claim 20, wherein said minimum CW value is selected from said range of values as follows:
for said collision rate between zero up to and including 25 percent, said minimum CW value is three slots;
for said collision rate between greater than 25 percent up to and including 50 percent, said minimum CW value is seven slots;
for said collision rate between greater than 50 percent up to and including 75 percent, said minimum CW value is fifteen slots; and
for said collision rate greater than 75 percent, said minimum CW value is 31 slots.

22. A computer system as described in claim 21, wherein each slot is equal to 20 microseconds.

23. A computer system as described in claim 16, wherein said contention window includes a CW value, wherein said minimum CW value of said contention window is used to calculate subsequent CW values of said contention window, whereby said subsequent CW values include a first, second, and on up to $n^{th}$ CW values, whereby said first CW value is calculated as two times said minimum CW value plus one, and subsequent CW values for said contention window are calculated such that $CW_n = 2(CW_{n-1}) + 1$.

24. A computer system as described in claim 23, comprising the further step of setting a backoff period from said contention window by randomly selecting a value between zero and said CW value of said contention window.

* * * * *